(12) United States Patent
Tamura et al.

(10) Patent No.: US 12,434,668 B2
(45) Date of Patent: Oct. 7, 2025

(54) WIPER BLADE LINKING STRUCTURE

(71) Applicant: MITSUBA Corporation, Gunma (JP)

(72) Inventors: Kazuhisa Tamura, Gunma (JP);
Kazuya Nishimura, Gunma (JP);
Nobutaka Nakajima, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/014,473

(22) PCT Filed: Feb. 25, 2022

(86) PCT No.: PCT/JP2022/007823
§ 371 (c)(1),
(2) Date: Jan. 5, 2023

(87) PCT Pub. No.: WO2022/219941
PCT Pub. Date: Oct. 20, 2022

(65) Prior Publication Data
US 2023/0278527 A1    Sep. 7, 2023

(30) Foreign Application Priority Data

Apr. 13, 2021 (JP) ................................. 2021-067645

(51) Int. Cl.
*B60S 1/40* (2006.01)

(52) U.S. Cl.
CPC .................................. *B60S 1/4019* (2013.01)

(58) Field of Classification Search
CPC .... B60S 1/4006; B60S 1/4009; B60S 1/4016; B60S 1/4019; B60S 2001/4022; B60S 2001/4012; B60S 2001/4029
(Continued)

(56) References Cited

U.S. PATENT DOCUMENTS

| 7,950,101 B2 * | 5/2011 | Kim ...................... B60S 1/4087 |
| | | 403/321 |
| 9,663,071 B2 * | 5/2017 | Avasiloaie ............ B60S 1/4003 |
| | (Continued) | |

FOREIGN PATENT DOCUMENTS

| CN | 2933984 | | 8/2007 |
| DE | 2637463 | * | 2/1978 |
| | (Continued) | | |

OTHER PUBLICATIONS

Machine translation of description portion of French publication 2486477, published Jan. 1982. (Year: 1982).*

(Continued)

*Primary Examiner* — Monica S Carter
(74) *Attorney, Agent, or Firm* — JCIPRNET

(57) ABSTRACT

A linking structure of a wiper blade 12 includes a wiper arm 10, the wiper blade 12, a hook part 10a provided at the wiper arm 10, and a linking part 13 provided at the wiper blade 12. The hook part 10a has a tip side extension part 10b in which a through hole 10c is formed. The linking part 13 has: a pair of sidewalls 13a, 13b facing each other; a cylindrical part 13c bonded to the pair of sidewalls 13a, 13b and engaged with the hook part 10a; a release lever 13d provided at the cylindrical part 13c; and a bridging part 13g bonded to the pair of sidewalls 13a, 13b. The release lever 13d is flexible, and includes a protrusion part 13f fittable with the through hole 10c. The tip part 13e of the release lever 13d protrudes to the outside of the linking part 13.

1 Claim, 8 Drawing Sheets

(58) Field of Classification Search
USPC .................................................... 15/250.32
See application file for complete search history.

(56) References Cited

U.S. PATENT DOCUMENTS

| | | | |
|---|---|---|---|
| 2002/0174505 A1* | 11/2002 | Kim | ................... B60S 1/40 15/250.32 |
| 2004/0123414 A1* | 7/2004 | Lee | ................. B60S 1/4019 15/250.32 |
| 2008/0086830 A1 | 4/2008 | Kim | |
| 2013/0152324 A1 | 6/2013 | Lee et al. | |

FOREIGN PATENT DOCUMENTS

| | | | | |
|---|---|---|---|---|
| DE | 3619589 | * | 12/1987 | |
| DE | 19745845 A1 | * | 4/1999 | ............ B60S 1/4009 |
| FR | 2377302 | * | 8/1978 | |
| FR | 2486477 | * | 1/1982 | |
| JP | 2006510529 | | 3/2006 | |
| JP | 3134473 | | 8/2007 | |
| JP | 2008037387 | | 2/2008 | |
| JP | 2012532790 | | 12/2012 | |
| JP | 2014507328 | | 3/2014 | |

OTHER PUBLICATIONS

Machine translation of description portion of German publication 3619589, published Dec. 1987. (Year: 1987).*
Machine language translation of Japanese publication 2008037387, published Feb. 2008. (Year: 2008).*
Machine translation of description portion of DE 19745845, published Apr. 1999. (Year: 1999).*
"International Search Report (Form PCT/ISA/210) of PCT/JP2022/007823", mailed on May 10, 2022, with English translation thereof, pp. 1-4.
"International Preliminary Report on Patentability(Form PCT/IB/373) of PCT/JP2022/007823," issued on Oct. 12, 2023, with English translation thereof, pp. 1-10.
"Office Action of China Counterpart Application", issued on Mar. 15, 2025, with English translation thereof, p. 1-p. 13.

* cited by examiner

WIPER BLADE LINKING STRUCTURE

CROSS-REFERENCE TO RELATED APPLICATION

This application is a 371 application of the International PCT application serial no. PCT/JP2022/007823, filed on Feb. 25, 2022, which claims the priority benefits of Japan Patent Application No. 2021-067645, filed on Apr. 13, 2021. The entirety of each of the above-mentioned patent applications is hereby incorporated by reference herein and made a part of this specification.

TECHNICAL FIELD

The invention relates to a wiper blade linking structure.

RELATED ART

Wiper devices are mounted in vehicles, such as automobiles. A wiper device includes a wiper motor as a driving source, a wiper arm swung through driving of the wiper motor, and a wiper blade mounted on the tip side of the wiper arm. The wiper arm and the wiper blade are linked by a linking structure as disclosed in Patent Document 1. In the linking structure disclosed in Patent Document 1, the wiper arm and the wiper blade are linked by connecting a U-shaped hook part of the wiper arm to a connector provided at the wiper blade.

CITATION LIST

Patent Literature

[Patent Document 1] Japanese Laid-open No. 2012-532790

SUMMARY OF INVENTION

Technical Problem

In the linking structure of the wiper arm and the wiper blade disclosed in Patent Document 1, the linking between the wiper arm and the wiper blade is removed by operating a release lever for linking removal that is provided at the connector on the side of the wiper blade for the wiper arm and the wiper blade that are linked.

However, the tip part of the release lever is disposed to be recessed to the inner side of the connector. Therefore, it is difficult to operate at the time of removing the linking between the wiper arm and the wiper lever, and the operability at the time of removing the linking is poor.

An objective of the invention is to provide a wiper blade linking structure with improved operability at the time of removing the linking between the wiper arm and the wiper blade.

Solution to Problem

A wiper blade linking structure according to an aspect of the invention includes: a wiper arm; a wiper blade, linked to the wiper arm; an engagement part, having a U shape and provided at the wiper arm; and a linking part, provided at the wiper blade and linked with the engagement part. The engagement part has a tip side extension part in which a through hole is formed. The linking part includes: a pair of sidewalls facing each other; a cylindrical part bonded to the pair of sidewalls and engaged with the engagement part; a lever part provided at the cylindrical part and extending along the pair of sidewalls; and a bridging part disposed to face the lever part and bonded to the pair of sidewalls. The lever part is flexible to bend toward a direction away from the bridging part, and includes a protrusion part fittable with the through hole, and The tip part of the lever part protrudes to outside of the linking part.

Effects of Invention

According to the invention, in the linking structure between the wiper arm and the wiper blade, the operability at the time of removing the linking can be improved.

DESCRIPTION OF EMBODIMENTS

In the following, the embodiments of the invention will be described in detail with reference to the drawings.

Figure 1:
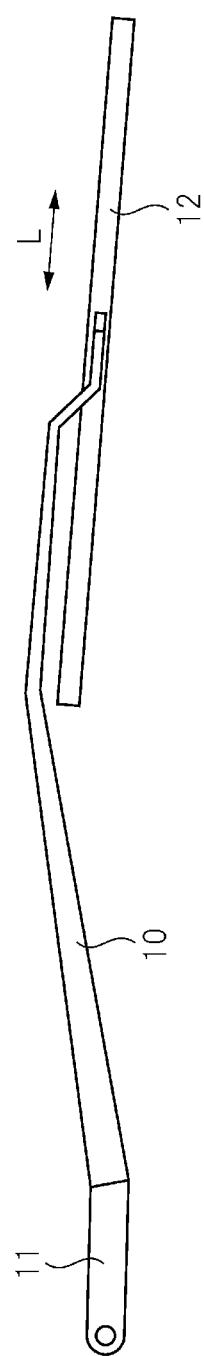
FIG. 1 is a view illustrating the appearance of a linking structure of a wiper blade according to the invention.

A linking structure of a wiper blade 12 shown in FIG. 1, for example, forms a wiper device (not shown) wiping a glass 16 (see FIG. 8) provided in a vehicle, such as an automobile. The linking structure of the wiper blade 12 includes an elongated wiper arm 10 shown in FIG. 2, a wiper blade 12 linked to the wiper arm 10, a hook part (engagement part) 10a having a U shape and provided at the wiper arm 10, and a linking part 13 provided at the wiper blade 12 and linked with the hook part 10a. The wiper arm 10 is rotatably supported by an arm head 11.

In addition, as shown in FIG. 1, the wiper blade 12 is rotatably linked to a position in the vicinity of the tip part of the wiper arm 10 in a longitudinal direction L of the wiper blade 12. Meanwhile, an output shaft (not shown) of a wiper motor forming the wiper device is fixed to the base end side of the wiper arm 10.

Figure 2:
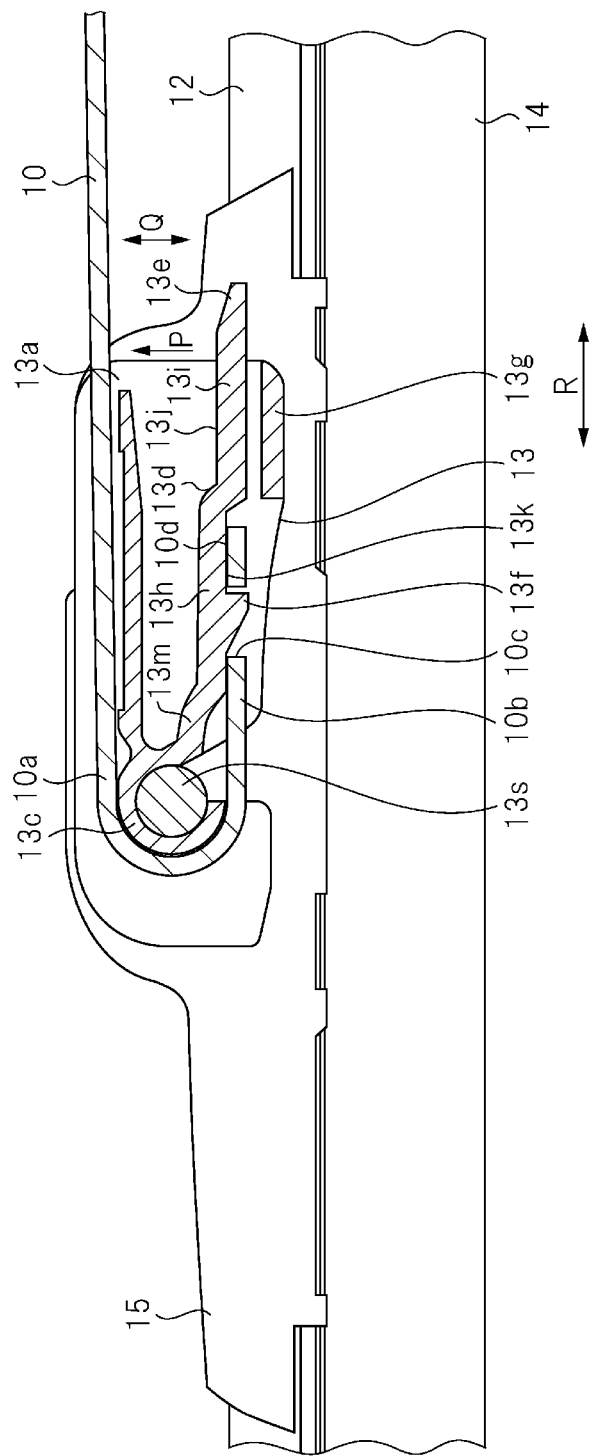
FIG. 2 is a partially enlarged cross-sectional view illustrating a detailed structure of the linking structure of the wiper blade shown in FIG. 1.

In addition, by performing an ON operation on a wiper switch provided in a vehicle interior, for example, the output shaft of the wiper motor rotates in a forward/backward direction to swing the wiper arm 10. Accordingly, as shown in FIG. 2, a blade lever 14 provided in the wiper blade 12 reciprocally wipes within a predetermined range on the glass 16. As a result, the rainwater, etc., attached to a wipe surface of the glass 16 is wiped away.

The wiper arm 10 and the wiper blade 12 are linked by engaging the hook part 10a of the wiper arm 10 and the linking part 13 of the wiper blade 12. Specifically, by fitting a protrusion part 13f provided at a release lever (lever part) 13d of the linking part 13 of the wiper blade 12 into a through hole 10c provided at a tip side extension part 10b of the hook part 10a of the wiper arm 10, the wiper arm 10 and the wiper blade 12 are linked.

Firstly, the hook part 10a of the wiper arm 10 is described. As shown in FIG. 2, the hook part 10a, which is the engagement part of the wiper arm 10, is formed in an U shape, and the tip side extension part 10b is provided on the tip side of the hook part 10a. In the tip side extension part 10b, an upper surface 10d is a flat surface. In addition, the through hole 10c is provided in a region where the upper surface 10d of the tip side extension part 10b is formed.

Figure 3:
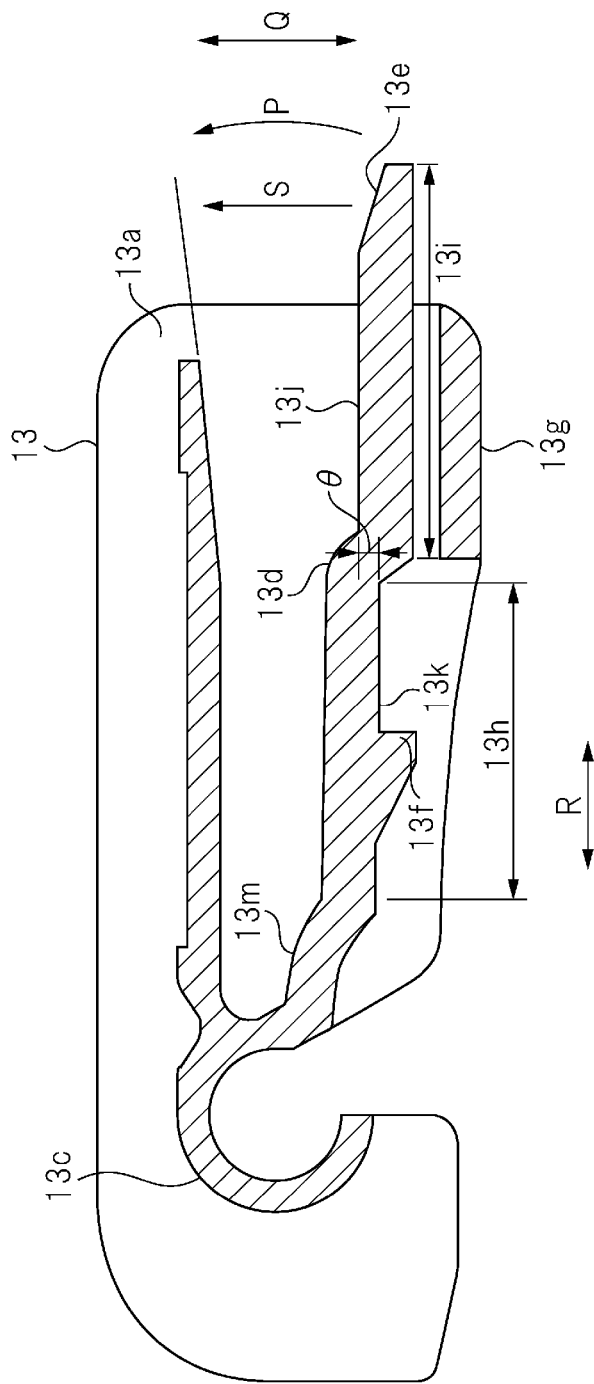
FIG. 3 is a cross-sectional view illustrating the structure of a linking part of the wiper blade shown in FIG. 2.
Figure 4:
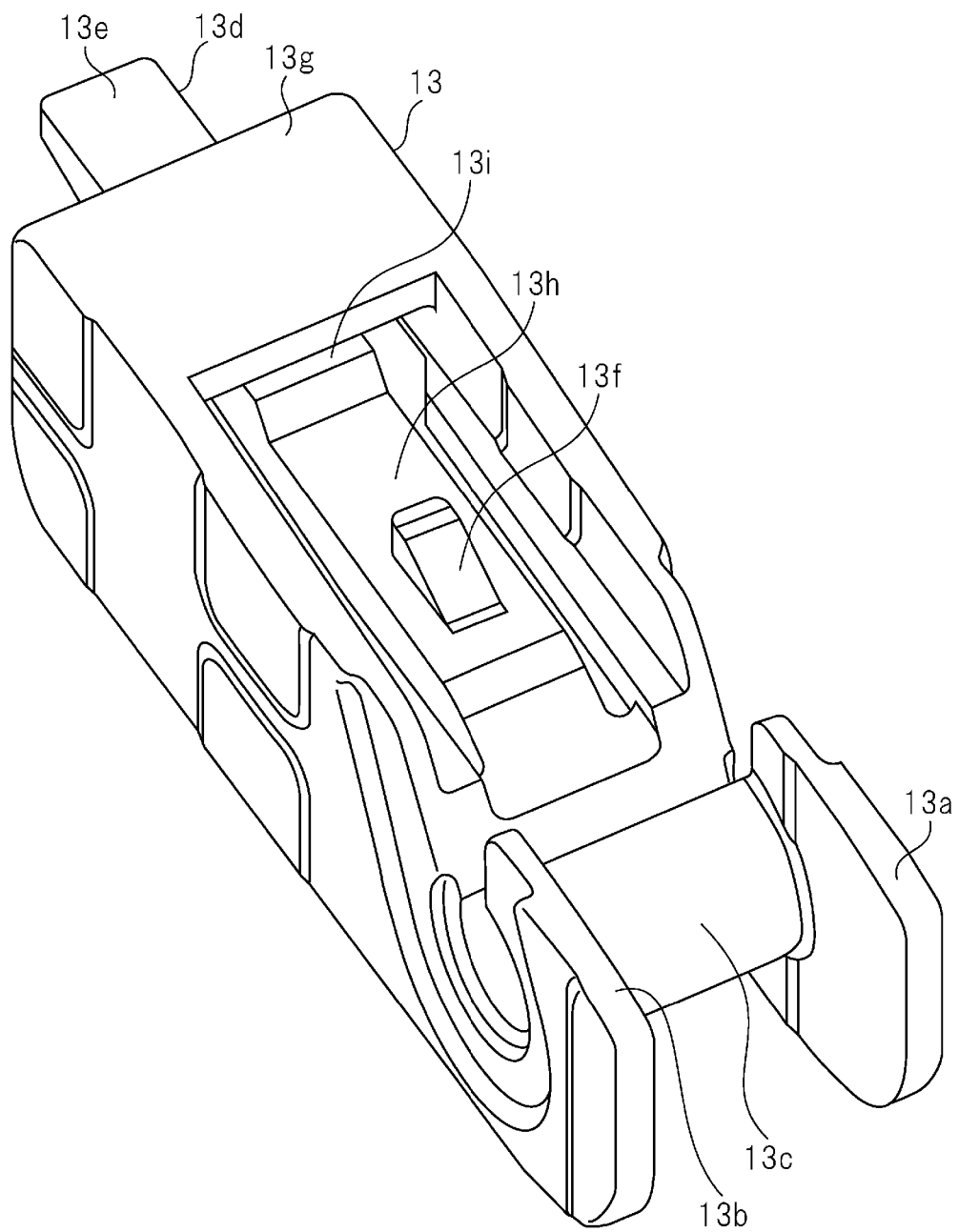
FIG. 4 is a perspective view illustrating a structure of a protrusion part in the linking part shown in FIG. 2.

Meanwhile, as shown in FIGS. 3 and 4, the linking part 13 provided at the wiper blade 12 includes a pair of sidewalls 13a, 13b facing each other and a cylindrical part 13c bonded to the pair of sidewalls 13a, 13b and engaged with the hook part 10a. Inside the cylindrical part 13c, a shaft part 13s shown in FIG. 2 is disposed, and the sidewalls 13a, 13b are bearing parts. In addition, the linking part 13 includes the release lever 13d provided at the cylindrical part 13c and extending along the pair of sidewalls 13a, 13b, and a bridging part 13g having a plate shape disposed to face a portion of the release lever 13d and bonded to the pair of sidewalls 13a, 13b. In addition, as shown in FIG. 2, the linking part 13 is covered by a cover 15.

Moreover, the release lever 13d is flexible to bend toward a direction (bending direction P) away from the bridging part 13g. In addition, the release lever 13d includes the protrusion part 13f fittable with the through hole 10c of the tip side of the wiper arm 10. The protrusion 13f is provided on the lower surface 13k that is a surface on the side of the bridging part 13g of the release lever 13d.

Here, the release lever 13d is a component operated to remove the linking between the wiper arm 10 and the wiper blade 12. By bending the release lever 13d in the bending direction P, the protrusion part 13f of the release lever 13d is disengaged from the through hole 10c of the wiper arm 10 to release the wiper arm 10. Accordingly, the linking between the wiper arm 10 and the wiper blade 12 is removed.

In the linking part 13, a tip part 13e of the release lever 13d protrudes to the outside of the linking part 13. Specifically, the tip part 13e of the release lever 13d protrudes toward the outer side with respect to the sidewalls 13a, 13b and the bridging part 13g of the linking part 13.

Therefore, at the time of removing the linking between the wiper arm 10 and the wiper blade 12, it is easy to operate the tip part 13e of the release lever 13d, and the operability of the release lever 13d at the time of removing the linking can be improved.

In addition, the bridging part 13g is a component bonded to both of the sidewalls 13a, 13b and increases the rigidity of the sidewalls 13a, 13b as the bearing parts of the linking part 13. As shown in FIG. 3, the bridging part 13g may be provided in a thin plate shape so as not to obstruct a stroke S of the release lever 13d. However, the bridging part 13g is not limited to being plate-shaped.

In addition, the release lever 13d includes a root part 13m provided at the cylindrical part 13c, a first portion 13h connected to the root part 13m and disposed on the side of the cylindrical part 13c, and a second portion 13i disposed on a tip side opposite to the side of the cylindrical part 13c and connected to the first portion 13h. That is, the release lever 13d is formed by the root part 13m, the first portion 13h, and the second portion 13i, and the tip part 13e is included in the second portion 13i. In other words, the portion protruding to the outer side of the linking part 13 in the release lever 13d is a portion of the second portion 13i including the tip part 13e. Specifically, a portion of the second portion 13i of the release lever 13d disposed inside the linking part 13 faces the bridging part 13g, and rest portions of the second portion 13i protrude to the outer side from the linking part 13.

In addition, as shown in FIG. 2, in the first portion 13h of the release lever 13d, the lower surface 13k, which is a surface of the first portion 13h on the side of the bridging part 13g, is able to abut against the tip side extension part 10b of the wiper arm 10. Specifically, when the wiper arm 10 and the wiper blade 12 are linked to the linking part 13, the lower surface 13k of the first portion 13h of the release lever 13d abuts against the upper surface 10d of the tip side extension part 10b of the wiper arm 10. Specifically, the lower surface 13k of the first portion 13h of the release lever 13d is inclined at an angle θ toward the tip of the release lever 13d with respect to a horizontal surface. For example, as shown in FIG. 3, the lower surface 13k of the first portion 13h of the release lever 13d is inclined at an angle θ toward the tip side of the release lever 13d with respect to the upper surface 13j of the second portion 13i that is a surface parallel to the horizontal surface. As an example, the angle is 1 degree. That is, the lower surface 13k of the first portion 13h is inclined at 1 degree in a direction opposite to the bending direction P toward the tip of the release lever 13d. Accordingly, when the wiper arm 10 and the wiper blade 12 are linked, as shown in FIG. 2, the protrusion part 13f of the first portion 13h of the release lever 13d can be fit into the through hole 10c of the tip side extension part 10b of the wiper arm 10. In addition, the lower surface 13k of the first portion 13h of the release lever 13d can abut against the upper surface 10d of the tip side extension part 10b of the wiper arm 10.

Moreover, as shown in FIGS. 3 and 4, the second portion 13i of the release lever 13d is disposed on the side of the bridging part 13g with respect to the first portion 13h in a first direction Q parallel to the bending direction P of the release lever 13d. In other words, the second portion 13i is disposed in a direction closer to the bridging part 13g than the first portion 13h. Furthermore, when expressed in a different way, the second portion 13i is disposed in a direction opposite to the bending direction P with respect to the first portion 13h. That is, the second portion 13i is provided to form a step difference toward a direction opposite to the bending direction P with respect to the first portion 13h.

By adopting the shape of the release lever 13d according to the above, in the structure in which the wiper arm 10 and the wiper blade 12 are linked as shown in FIG. 2, the tip side extension part 10b of the wiper arm 10 and the second portion 13i of the release lever 13d are at least partially overlapped with each other in a second direction R intersecting with the first direction Q. Specifically, in the second direction R, at least a portion of a thickness portion of the tip side extension part 10b of the wiper arm 10 and at least a portion of a thickness portion of the second portion 13i of the release lever 13d are overlapped. Accordingly, the tip side extension part 10b of the wiper arm 10 can be disposed in a space on the side of the lower surface 13k formed from the step difference between the first portion 13h and the second portion 13i. As a result, the lower surface 13k of the first portion 13h of the release lever 13d can abut against the upper surface 10d of the tip side extension part 10b of the wiper arm 10, and the stroke S toward the bending direction P of the release lever 13d as shown in FIG. 3 can be secured.

Figure 5:
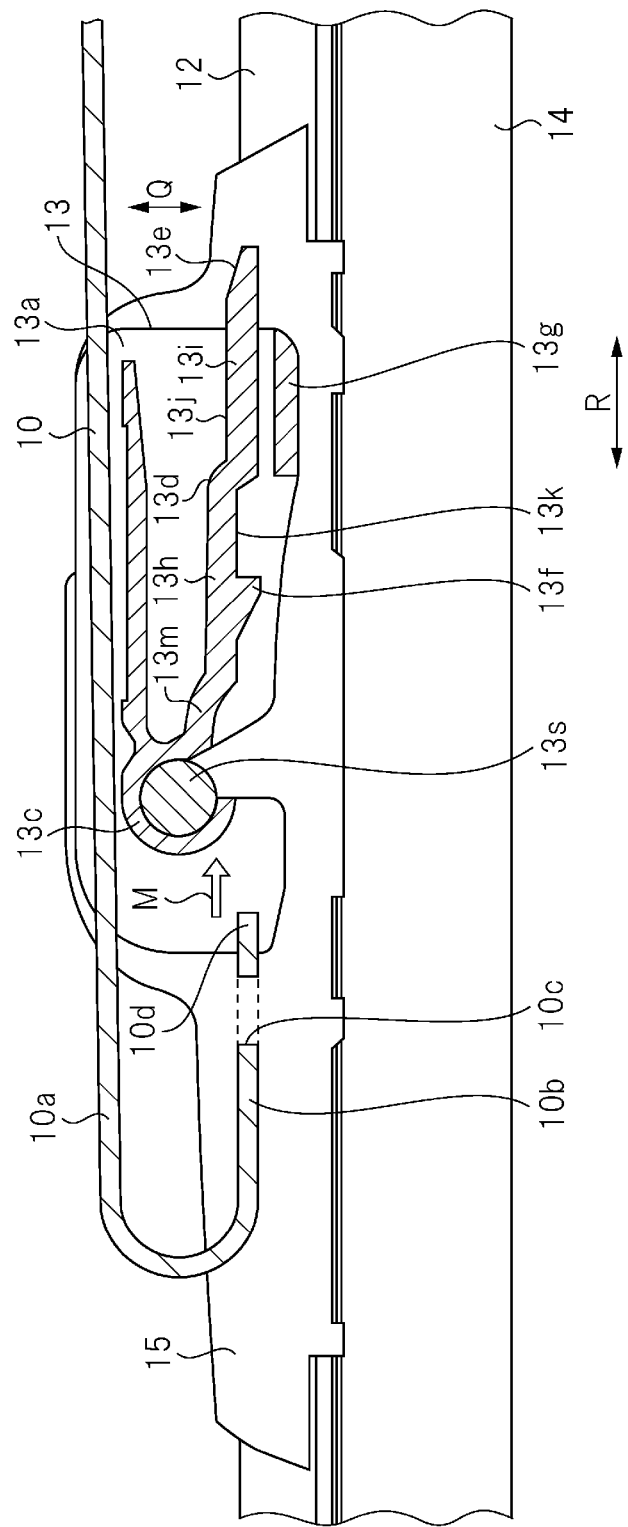
FIG. 5 is a partial cross-sectional view illustrating a state in which a wiper arm is mounted to the linking part of the wiper blade shown in FIG. 2.

When the wiper arm 10 and the wiper blade 12 are linked, as shown in FIG. 5, the wiper arm 10 is inserted from an insertion direction M with respect to the linking part 13 provided at the wiper blade 12, and, as shown in FIG. 2, the wiper arm 10 and the wiper blade 12 are linked. At this time, the lower surface 13k of the first portion 13h of the release lever 13d is inclined toward a direction opposite to the bending direction P. Therefore, when the protrusion part 13f of the first portion 13h is fit into the through hole 10c of the wiper arm 10, the lower surface 13k of the first portion 13h of the release lever 13d can abut against the upper surface 10d of the tip side extension part 10b of the wiper arm 10, and a click sound can be generated due to the abutting. Accordingly, a sense of operation when the wiper arm 10 and the wiper blade 12 are linked can be facilitated.

Figure 6:
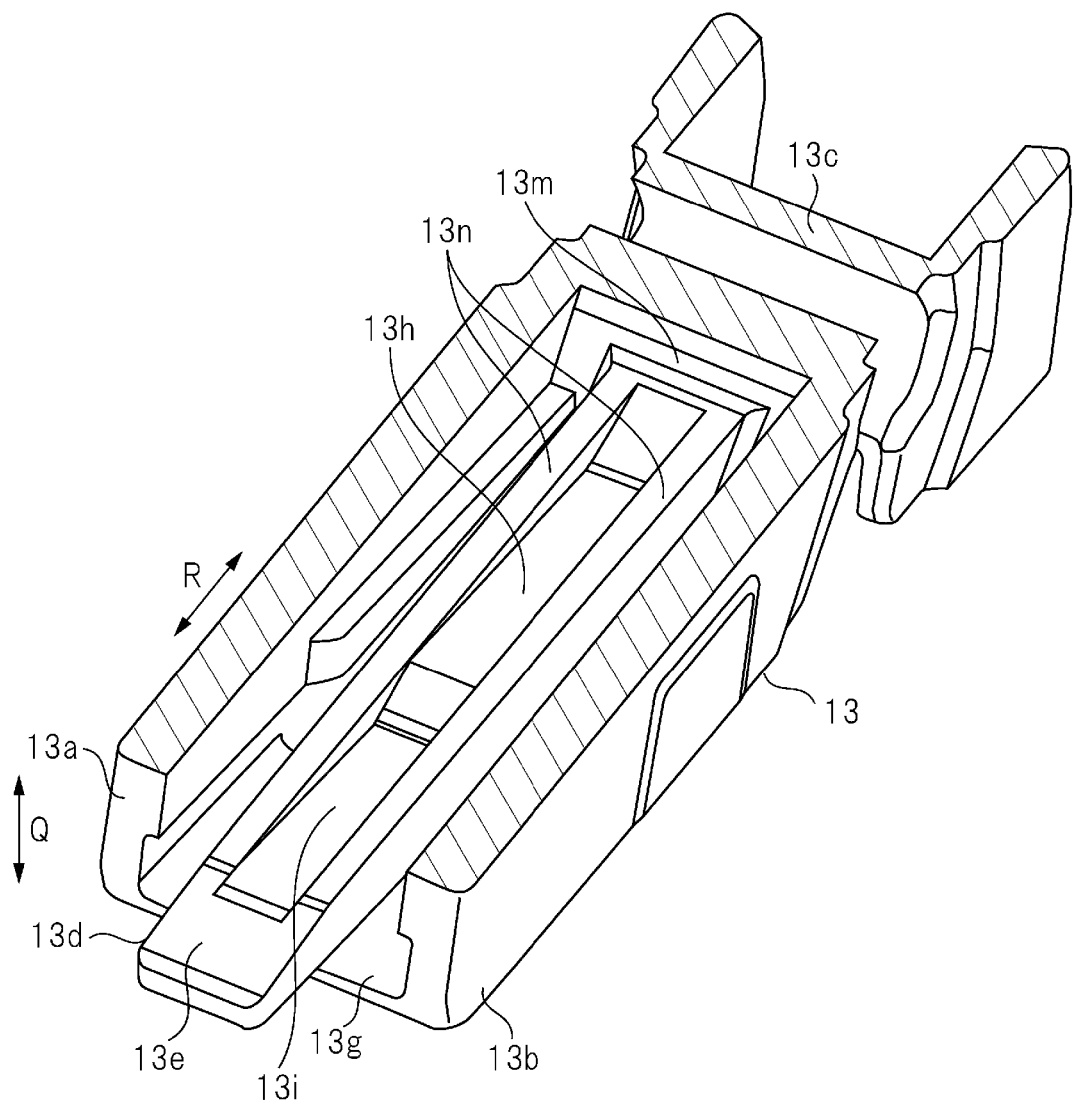
FIG. 6 is a partial cutaway view illustrating a structure of a rib provided at a lever part of the linking part shown in FIG. 2.

Moreover, as shown in FIG. 6, on each of the two side parts of the first portion 13h and the second portion 13i of the release lever 13d, a rib 13n extending in the second direction R is provided. Specifically, the rib 13n raised along the first direction Q is provided at each of the two side end parts of the first portion 13h and the second portion 13i of the release lever 13d in the width direction. The ribs 13n are provided at the two side parts of the first portion 13h and the second portion 13i only, but are not provided at the root part 13m.

The release lever 13d of the embodiment is provided so that the vicinity of the tip part 13e of the release lever 13d protrudes toward the outer side from the linking part 13, and the length of the release lever 13d is increased. Moreover, since the release lever 13d is long, when removing the linking between the wiper arm 10 and the wiper blade 12, even if an operation of pushing up the release lever 13d toward the bending direction P is performed, it is possible that the protrusion part 13f does not follow. Moreover, in the release lever 13d, a step difference is provided between the first portion 13h and the second portion 13i. Therefore, there is a concern that the strength of the release lever 13d may be reduced.

Therefore, in the release lever 13d of the embodiment, the ribs 13n are provided at the two side parts (two side end parts) of the first portion 13h and the second portion 13i only, but are not provided at the root part 13m. That is, only the rigidity of the first portion 13h and the second portion 13i are increased by the ribs 13n, and the rigidity of the root part 13m is not increased. Accordingly, at the time of performing the operation of pushing up the release lever 13d toward the bending direction P, the release lever 13d can be reliably bent toward the bending direction P, and the rigidity of the first portion 13h and the second portion 13i is increased. Therefore, the protrusion part 13f can be made to follow.

In detail, in the release lever 13d of the embodiment, the tip part 13e protrudes toward the outer side of the linking part 13 to facilitate operability, and the length from the root part 13m to the tip part 13e is increased. Meanwhile, in the linking part 13, in order to increase the rigidity of the sidewalls 13a, 13b as the bearing parts, the bridging part 13g connecting the sidewalls 13a and 13b is provided to face a portion of the release lever 13d (a portion of the second portion 13i). Therefore, by providing the bridging part 13g, it is difficult to sufficiently secure the stroke S of the second portion 13i including the tip part 13e of the release lever 13d toward the bending direction P. If the stroke amount of the release lever 13d toward the bending direction P is insufficient, when removing the linking between the wiper arm 10 and the wiper blade 12, the protrusion part 13f is disengaged from the through hole 10c of the wiper arm 10. Therefore, with the step difference between the first portion 13h and the second portion 13i in the release lever 13d, the stroke amount of the release lever 13d toward the bending direction P is secured, and with the ribs 13n at the two side parts (two side end parts) of the first portion 13h and the second portion 13i, the rigidity of the first portion 13h and the second portion 13i is increased. Nevertheless, since the ribs 13n are not provided at the root part 13m of the release lever 13d, the rigidity of the root part 13m is low, and it is possible to bend the release lever 13d by using the root part 13m. According to the above, at the time when the release lever 13d is bent toward the bending direction P when the linking between the wiper arm 10 and the wiper blade 12 is removed, by increasing the rigidity of the first portion 13h and the second portion 13i, the protrusion part 13f can be made to follow and move, and the protrusion 13f can be disengaged from the through hole 10c to remove the linking between the wiper arm 10 and the wiper blade 12. Therefore, by adopting the release lever 13d of the embodiment, the operability of the release lever 13d is increased at the time of removing the linking between the wiper arm 10 and the wiper blade 12, and the removal of the linking between the wiper arm 10 and the wiper blade 12 can be carried out reliably.

Figure 7:
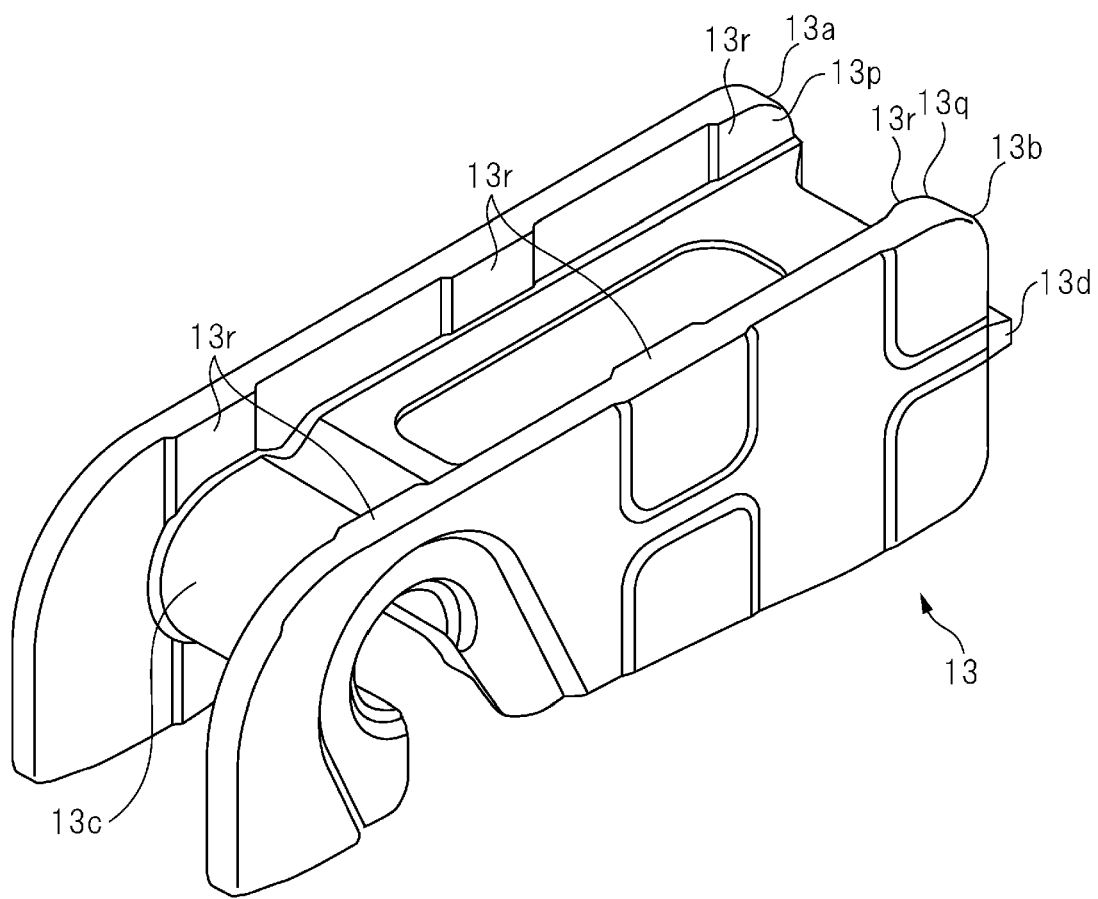
FIG. 7 is a perspective view illustrating a contact surface in the linking part shown in FIG. 2. (a) and (b) of FIG. 8 are views illustrating a state of the linking part when the wiper arm shown in FIG. 2 wipes. (a) of FIG. 8 is a schematic view illustrating an effect of the linking part, and (b) is a schematic view illustrating a defect of the linking part.

Moreover, as shown in FIG. 7, abutting surfaces 13r (protruding parts) protruding with respect to respective facing surfaces 13p, 13q of the pair sidewalls 13a, 13b of the linking part 13 are provided on the facing surfaces 13p, 13q. Specifically, multiple abutting surfaces 13r protruding with respect to the facing surface 13p are provided on the facing surface 13p of the sidewall 13a, and multiple abutting surfaces 13r protruding with respect to the facing surface 13q are also provided on the facing surface 13q of the sidewall 13b.

Accordingly, at the time of linking the wiper arm 10 to the linking part 13, the side part of the wiper arm 10 can abut against the abutting surface 13r, and the vibration of the wiper arm when the wiper arm 10 wipes the glass 16 (see FIG. 8) can be suppressed. Accordingly, the damage to the wiper arm 10 or the linking part 13 can be reduced.

Figure 8:
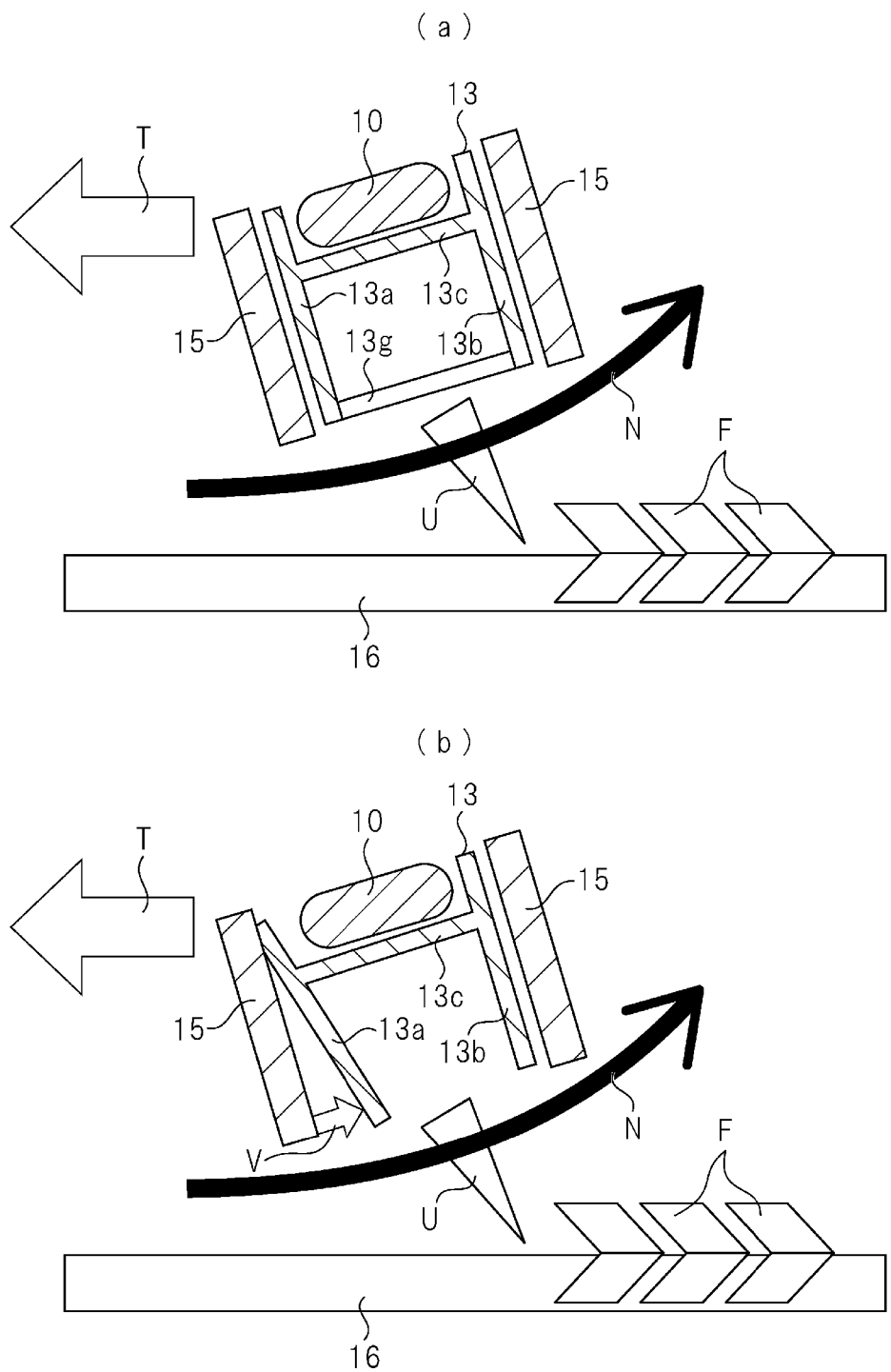

As shown in (a) of FIG. 8, in the linking structure of the wiper blade 12 of the embodiment, the bridging part 13g respectively connected with the pair of sidewalls 13a, 13b facing each other is provided in the linking part 13. Accordingly, the rigidity of the sidewalls 13a, 13b as the bearing parts can be increased.

Here, in the wipe operation of the wiper arm 10, as shown in (b) of FIG. 8, when the wiper arm 10 moves in an arm traveling direction T along the wipe surface of the glass 16, a load N due to a friction force F with the wipe surface and a pushing force U to the wipe surface is generated, and a large stress V is applied to the sidewall 13a on the side of the arm traveling direction T. The linking part 13 has a relatively large number of cavities inside, and as a result, the rigidity of the sidewalls 13a and 13b is low. Therefore, when the large stress V is applied to the sidewall 13a, an issue that the sidewall 13a collapse and the wipe performance of the wiper arm 10 is deteriorated occurs.

Therefore, in the linking part 13 of the embodiment, as shown in (a) of FIG. 8, by providing the bridging part 13g connecting the sidewall 13a and the sidewall 13b, the rigidity of the sidewalls 13a, 13b is increased. Accordingly, in the wipe operation of the wiper arm 10, even if the large stress V is applied to the sidewall 13a or the sidewall 13b as shown in (b) of FIG. 8, the sidewall 13a and the sidewall 13b neither collapse nor be damaged, and the wipe performance of the wiper arm 10 is not affected.

Thus, in the linking structure between the wiper arm 10 and the wiper blade 12 according to the embodiment, the strength of the linking part 13 is increased, and the tip part 13e of the release lever 13d protrudes to the outside of the linking part 13. Therefore, the operability at the time of removing the linking between the wiper arm 10 and the wiper blade 12 can be facilitated.

It goes without saying that the invention is not limited to the above-described embodiments, and various modifications can be made without departing from the gist of the invention. For example, in the embodiment, the linking structure of the wiper blade 12 may also be applied to a rear wiper device wiping the rear glass of a vehicle such as an automobile, or be applied to a wiper device mounted on the front side of a vehicle such as an automobile. Moreover, it is also possible to apply the linking structure to a wiper device mounted in a ship, an airplane, a rail vehicle, etc. Furthermore, the wiper arm 10 according to the embodiment may be molded by using a resin material or by using a metal material.

What is claimed is:

1. A wiper blade linking structure, comprising:
a wiper arm;
a wiper blade, linked to the wiper arm;
an engagement part, having a U shape and provided at the wiper arm; and
a linking part, provided at the wiper blade and linked with the engagement part,
wherein the engagement part has a tip side extension part in which a through hole is formed,
the linking part comprises: a pair of sidewalls facing each other; a cylindrical part bonded to the pair of sidewalls and engaged with the engagement part; a lever part provided at the cylindrical part and extending along the pair of sidewalls; and a bridging part disposed to face the lever part and bonded to the pair of sidewalls, wherein the lever part is flexible to bend toward a direction away from the bridging part, and comprises a protrusion part fittable with the through hole, and
a free terminal end of the lever part resides at a distance further from the cylindrical part along a longitudinal direction of the wiper blade than an end of the pair of sidewalls or the bridging part along the longitudinal direction of the wiper blade,
wherein there is a plurality of protruding parts provided on a facing surface of each of the pair of sidewalls, and the plurality of protruding parts protrudes with respect to the facing surface and extends to both an upper edge and a lower edge of each of the pair of sidewalls,
the lever part comprises a first portion disposed on a side of the cylindrical part and a second portion disposed on a side opposite to the side of the cylindrical part and connected to the first portion,
in the first portion, a surface of the first portion on a side of the bridging part is abuttable with the tip side extension part,
the second portion is disposed on the side of the bridging part with respect to the first portion in a first direction parallel to a direction in which the lever part is bent,
the tip side extension part and the second portion are at least partially overlapped with each other in a second direction intersecting with the first direction, and
ribs are provided along the second direction at two side end parts of each of the first portion and the second portion in a width direction.

* * * * *